(12) United States Patent
Wu et al.

(10) Patent No.: US 11,926,913 B2
(45) Date of Patent: Mar. 12, 2024

(54) METHOD AND APPARATUS FOR REMOVING AMMONIA NITROGEN FROM ELECTROLYTIC MANGANESE RESIDUE

(71) Applicant: GUIZHOU UNIVERSITY, Guiyang (CN)

(72) Inventors: Pan Wu, Guiyang (CN); Zhengyan Ran, Guiyang (CN); Youfa Luo, Guiyang (CN); Xuexian Li, Guiyang (CN)

(73) Assignee: GUIZHOU UNIVERSITY, Guiyang (CN)

( * ) Notice: Subject to any disclaimer, the term of this patent is extended or adjusted under 35 U.S.C. 154(b) by 0 days.

(21) Appl. No.: 18/321,862

(22) Filed: May 23, 2023

(65) Prior Publication Data

US 2023/0399765 A1  Dec. 14, 2023

(30) Foreign Application Priority Data

Jun. 14, 2022 (CN) .......................... 202210672012.3

(51) Int. Cl.
*C25C 1/10* (2006.01)
*B01D 21/00* (2006.01)
(Continued)

(52) U.S. Cl.
CPC ............ *C25C 1/10* (2013.01); *B01D 21/0012* (2013.01); *B01D 21/003* (2013.01); *B01D 21/10* (2013.01);
(Continued)

(58) Field of Classification Search
CPC ......... C25C 1/10; C25C 7/06; B01D 21/0012; B01D 21/003; B01D 21/10; B01D 21/2427; B01D 21/2472; C02F 2103/16
See application file for complete search history.

(56) References Cited

U.S. PATENT DOCUMENTS

| 769,595 A | * | 9/1904 | Dunn | ..................... | B01F 31/441 |
| | | | | | 366/258 |
| 1,752,789 A | * | 4/1930 | Downes | ................ | B01D 21/003 |
| | | | | | 210/197 |
| 2,473,297 A | * | 6/1949 | Parker | ................... | B01D 21/186 |
| | | | | | 210/522 |

FOREIGN PATENT DOCUMENTS

| CN | 108940091 A | 12/2018 | | |
| CN | 109432859 A | * | 3/2019 | ............. B01D 29/96 |

(Continued)

OTHER PUBLICATIONS

Chen et. al. 2022 "Multi-step purification of electrolytic manganese residue leachate using hydroxide sedimentation, struvite precipitation, chlorination and coagulation: advanced removal of manganese, ammonium, and phosphate". Science of the Total Environment 805 150237 (Year: 2022).*

(Continued)

*Primary Examiner* — Liam Royce
(74) *Attorney, Agent, or Firm* — Stuart H. Mayer; Kaplan Breyer Schwarz LLP

(57) ABSTRACT

A method and equipment for removing ammonia nitrogen from electrolytic manganese residue are provided in the technical field of solid waste resource utilization. The method includes following steps: step 1: adding phosphate and magnesium salt into electrolytic manganese residue leachate and fully reacting, where after the phosphate and the magnesium salt are added, n (Mg):n (N):n (P)=1.1-1.3: 1:1 in the electrolytic manganese residue leachate; step 2: on a basis of the step 1, adjusting pH of the electrolytic manganese residue leachate to alkalinity, and stirring and reacting for 10-30 min; and step 3: on a basis of the step 2, filtering the electrolytic manganese residue leachate to obtain purified leachate and struvite respectively.

5 Claims, 4 Drawing Sheets

(51) Int. Cl.
   *B01D 21/02*   (2006.01)
   *B01D 21/24*   (2006.01)
   *C25C 7/06*    (2006.01)
   *C02F 103/16*  (2006.01)

(52) U.S. Cl.
   CPC ..... *B01D 21/2427* (2013.01); *B01D 21/2472* (2013.01); *C25C 7/06* (2013.01); *C02F 2103/16* (2013.01)

(56) References Cited

FOREIGN PATENT DOCUMENTS

| CN | 111939814 A | * 11/2020 |
| CN | 212894070 U | 4/2021 |
| CN | 112794488 A | 5/2021 |

OTHER PUBLICATIONS

Qiu Jiang, "Study on Treatment of Ammonia Wastewater from Electrolytic Manganese" A Thesis Submitted to Chongqing University in Partial Fulfillment of the Requirement for the Master's Degree of Engineering, May 2015.

* cited by examiner

| Pouring the electrolytic manganese residue leachate and deionized water respectively into a treatment tank at both sides of a partition plate according to a volume ratio of 1:1, then dissolving bone meal in the deionized water, dissolving $MgCl_2 \cdot 6H_2O$ in the electrolytic manganese residue leachate, starting a motor after the bone meal and the $MgCl_2 \cdot 6H_2O$ are completely dissolved, with a motor speed of 300 r/min, driving the partition plate by the motor to reciprocate, thereby mixing the electrolytic manganese residue leachate with the deionized water, and keeping this process for 15 min until the $MgCl_2 \cdot 6H_2O$, ammonia nitrogen in the electrolytic manganese residue leachate and the bone meal in the deionized water are fully mixed and reacted to obtain a mixed solution, wherein in the mixed solution n (Mg): n (N): n (P) = 1.1 - 1.3: 1: 1; | — Step 1 |

↓

| On a basis of the step 1, adjusting pH of the mixed solution to 10 with 250 g/L sodium hydroxide and 100 g/L sodium hydroxide respectively, and stirring and reacting for 15 min under a condition of the 300 r/min of the motor at room temperature | — Step 2 |

↓

| On a basis of the step 2, driving a sliding block to move by the motor under a condition of 50 r/min until liquid in the mixed solution is discharged from a liquid outlet hole to separate struvite and electrolytic manganese residue leachate after ammonia nitrogen removal | — Step 3 |

FIG. 5

METHOD AND APPARATUS FOR REMOVING AMMONIA NITROGEN FROM ELECTROLYTIC MANGANESE RESIDUE

CROSS-REFERENCE TO RELATED APPLICATIONS

This disclosure claims priority to Chinese Patent Application No. 202210672012.3, filed on Jun. 14, 2022, the contents of which are hereby incorporated by reference.

TECHNICAL FIELD

The disclosure belongs to the technical field of solid waste resource utilization, and particularly relates to a method and apparatus for removing ammonia nitrogen from electrolytic manganese residue.

BACKGROUND

Electrolytic manganese industry produces electrolytic manganese in a way of leaching by adding sulfuric acid to rhodochrosite, which is a typical high energy consumption and high pollution industry. According to statistics, every one ton of electrolytic manganese metal produces about 6-7 tons of manganese sulfate waste residue. Due to backward production technology and low ore grades, the amount of acid leaching residue per ton of finished products is increased to 7-9 tons. Although there are many attempts to dispose the waste residue, the technology is still immature and the amount of the waste residue is large, which leads to a landfill method still being the most common method at present. Therefore, the surface rainfall runoff seeps into a landfill site and is transformed into pollution-intensive leachate through physical and chemical actions, which makes the water around the landfill site is polluted for multiple reasons, such as the leachate from the improperly sealed landfill site, the landfill site with damaged geomembrane or the landfill site in use seeping into the surface groundwater environment. The water quality characteristics of manganese residue leachate are closely related to the production process of electrolytic manganese. $H_2SO_4$, $NH_3 \cdot H_2O$, $K_2CrO_7$ and $SeO_2$ are added as extractant and buffer solution during the production process of electrolytic manganese, which leads to a high concentration of environmental pollutants in electrolytic manganese residue leachate.

At present, the common method for treating electrolytic manganese residue leachate is to set up a collection pool for collection, and then pump the electrolytic manganese residue leachate back to the factory to be treated simultaneously with production wastewater. If the leachate is not produced much, it will be directly placed in the pool for evaporation. However, due to the limitation of terrain and other conditions, many landfill sites are far away from the production workshop, so it is unrealistic to pump the leachate back to the workshop for treatment, and most of the leachate is discharged into the environment, resulting in environmental pollution and waste of resources. At present, the treatment of electrolytic manganese residue leachate mainly focuses on high concentration of $Mn^{2+}$ and $Cr^{6+}$, there is little research on treating ammonia nitrogen, and the existing treatment processes are ion exchange and air stripping.

A struvite precipitation method for treating wastewater containing nitrogen and phosphorus is highly anticipated by current researchers because the struvite precipitation method is able to effectively remove nutrients from wastewater and reduce eutrophication of water, and it is also an effective slow-release fertilizer. Struvite contains a large amount of N, P and Mg elements necessary for plant growth, and compared with conventional chemical fertilizers, the struvite has its unique advantages. It is found that the typical electrolytic manganese residue leachate in Guizhou has a high content of $NH_4$—N, ranging from 30.54 milligram/liter (mg/L) to 3161 mg/L depending on the present situation of landfill site. In addition, due to the local geological background and the characteristics of electrolytic manganese process, the content of $Mg^{2+}$ in the leachate is also extremely high, up to 46.15 mg/L-3937 mg/L. Through calculation, it is found that the molar ratio of nitrogen to magnesium is 1-3, which provides a good material source for struvite precipitation. According to the standard molar ratio of n (Mg):n (N):n (P)=1:1:1 in the struvite precipitation method, ammonia nitrogen in electrolytic manganese residue leachate is able to be removed by the struvite precipitation method only by adding phosphate and a small amount of magnesium salt.

SUMMARY

The disclosure provides a method for removing ammonia nitrogen from electrolytic manganese residue, so as to effectively recover high-concentration ammonia nitrogen from electrolytic manganese residue leachate.

The method for removing ammonia nitrogen from electrolytic manganese residue in the scheme includes following steps:

step 1: adding phosphate and magnesium salt into electrolytic manganese residue leachate and fully reacting, where after the phosphate and the magnesium salt are added, n (Mg):n (N):n (P)=1.1-1.3:1:1 in the electrolytic manganese residue leachate;

step 2: on a basis of the step 1, adjusting pH of the electrolytic manganese residue leachate to alkalinity, and stirring for 10-30 minutes (min); and step 3: on a basis of the step 2, filtering the electrolytic manganese residue leachate to obtain purified leachate and struvite respectively.

This scheme has following beneficial effects: the ammonia nitrogen in the electrolytic manganese residue leachate is effectively removed by adding the phosphate and the magnesium salt into the electrolytic manganese residue leachate and adjusting the electrolytic manganese residue leachate to alkalinity, so the electrolytic manganese residue leachate is purified and relatively pure struvite is recovered, and multiple environmental, economical and ecological benefits are realized.

Optionally, in the step 1, after the phosphate and the magnesium salt are added, the electrolytic manganese residue leachate is stirred at a stirring speed of 300 revolutions per minute (r/min)-600 r/min for 0-30 min. Through stirring, the ammonia nitrogen in the electrolytic manganese residue leachate reacts with the phosphate and the magnesium salt more fully, and the electrolytic manganese residue leachate is purified more thoroughly.

Optionally, in the step 2, a range of the pH of the electrolytic manganese residue leachate is 7.5-10.5, the stirring speed is 300 r/min-600 r/min, and a stirring time is 0-30 min. Through stirring, the ammonia nitrogen in the electrolytic manganese residue leachate reacts with the phosphate and the magnesium salt more fully.

Optionally, the phosphate is bone meal. The bone meal comes from animal bones and is an important phosphorus source, therefore using local materials conveniently and further utilizing resource reasonably.

During removing the ammonia nitrogen from the electrolytic manganese residue, a full contact of magnesium, nitrogen and phosphorus is an important prerequisite to remove the ammonia nitrogen from the electrolytic manganese residue effectively and also an important means to improve removal efficiency of the ammonia nitrogen from the electrolytic manganese residue. Increasing a turbulence intensity of the electrolytic manganese residue leachate is an important means to enhance the contact and reaction of the magnesium, the nitrogen and the phosphorus in the electrolytic manganese residue leachate, and an important method to ensure the effective removal of the ammonia nitrogen in the electrolytic manganese residue. At present, in removing the ammonia nitrogen from the electrolytic manganese residue, the contact of the magnesium, the nitrogen and the phosphorus is mainly enhanced by stirring the electrolytic manganese residue leachate. This disclosure provides an apparatus, and the apparatus is increasing the fluidity of the electrolytic manganese residue leachate while stirring the electrolytic manganese residue leachate, thereby enhancing the turbulence intensity of the electrolytic manganese residue leachate and promoting the magnesium, the nitrogen and the phosphorus in the electrolytic manganese residue leachate to fully mix.

An apparatus for removing ammonia nitrogen from electrolytic manganese residue is provided in another aspect, including a treatment tank, an overflow tank, a stirring component and an adjusting component. The overflow tank is connected to a top of the treatment tank, and a tank bottom of the overflow tank is attached to a surface of the treatment tank. A bottom of the overflow tank and the top of the treatment tank are both provided with two groups of guiding holes. The two groups of the guiding holes are adjacent to opposite side walls of the overflow tank and the treatment tank, and corresponding guiding holes on a same side of the overflow tank and the treatment tank are communicated. A lower surface of the treatment tank is provided with a limiting groove and grooves. A chute is arranged in a wall of the treatment tank along a length direction of the wall, one end of the chute penetrates through the wall of the treatment tank, and the chute is located right below the limiting groove. The adjusting component includes a partition plate and a driving component which drives the partition plate to reciprocate in the treatment tank. The partition plate is vertically arranged and divides the treatment tank into two portions, and the guiding holes on the treatment tank are located in a movement direction of the partition plate. The stirring component includes stirring rods and racks, the racks are slidably connected in the chute, and the stirring rods are rotatably connected in the wall of the treatment tank. Two ends of the stirring rods are respectively provided with gears and stirring blades. The stirring blades are positioned in the grooves, and the gears are meshed with the racks. A bottom of the partition plate is fixedly connected with a connecting rod, and the connecting rod is positioned in the limiting groove and fixedly connected with the racks.

The working principle and beneficial effects of this scheme are as follows: when in use, the electrolytic manganese residue leachate is put into the treatment tank, and then phosphate and magnesium salt are put in proportion until the treatment tank is full. The driving component drives the partition plate to reciprocate in the treatment tank. During the reciprocating movement of the partition plate, the partition plate squeezes the electrolytic manganese residue leachate on one side of the movement direction of the partition plate in the treatment tank, so that the electrolytic manganese residue leachate is squeezed into the guiding holes, thus entering the overflow tank, and then entering the treatment tank below from the guiding holes on an other side. In addition, during the movement of the partition plate, the connecting rod drives the racks to move, and the racks move to drive the gears. The stirring blades are driven to stir the electrolytic manganese residue leachate in the treatment tank, so the magnesium, the nitrogen and the phosphorus in the electrolytic manganese residue leachate are fully mixed and react completely.

Optionally, an outer wall of the treatment tank is fixedly connected with a base, a fixed plate is vertically and fixedly connected with the base, and a first limiting plate is fixedly connected with the fixed plate. The partition plate is fixedly connected with a first driving rod. The first driving rod extends out of the treatment tank, and one end of the first driving rod away from the partition plate is fixedly connected with a first sliding plate. The first sliding plate is connected between the first limiting plate and the base in a sliding way. The driving component includes a first traction rod, a motor and a driving disk installed on the motor, and the first traction rod is in a shape of "]" character. Two ends of the first traction rod are rotatably connected to an eccentric position of the driving disk and a side wall of the first sliding plate respectively. The motor drives the driving disk to rotate, and the driving disk drives the first traction rod to deflect on a vertical plane and reciprocate in a horizontal direction, thus driving the first driving rod and the partition plate to reciprocate, and the partition plate reciprocates to realize a flow of the electrolytic manganese residue leachate, and meanwhile, the partition plate drives the stirring blades to stir the electrolytic manganese residue leachate when the partition plate reciprocates.

Optionally, the stirring blades are spiral. The stirring blades are spiral, which make the stirring blades stir the electrolytic manganese residue leachate into a vortex shape during the process of stirring the electrolytic manganese residue leachate, thereby improving the turbulence intensity of the electrolytic manganese residue leachate and further promoting the magnesium, the nitrogen and the phosphorus in the electrolytic manganese residue leachate to mix.

Optionally, the overflow tank is internally connected with a sliding block in a sliding way, a bottom of the sliding block is provided with a drainage groove, the bottom of the overflow tank and the top of the treatment tank are both provided with two groups of drainage holes, the two groups of the drainage holes are both located between the two groups of the guiding holes, and corresponding drainage holes on a same side of the overflow tank and the treatment tank are communicated. A length of the drainage groove is smaller than a distance between the two groups of the drainage holes. One group of the drainage holes is communicated with the drainage groove. The inner bottom of the overflow tank is provided with a liquid outlet groove, an outer wall of the overflow tank is provided with a liquid outlet hole communicated with the liquid outlet groove, and the liquid outlet hole is connected with a screw rod by threads. The outer wall of the treatment tank is provided with connecting holes, the connecting holes are communicated with the guiding holes, and the connecting holes are internally connected with plugging rods for plugging the guiding holes by threads. The fixed plate is fixedly connected with a second limiting plate, the second limiting plate is positioned above the first limiting plate, and a second sliding plate is connected between the first limiting plate and the second limiting plate in a sliding way. The sliding block is fixedly connected with a second driving rod, and one end of the second driving rod away from the sliding block extends out of the overflow tank and is fixedly connected with the second sliding plate. The driving component also includes a second traction rod, and the second traction rod is also in a shape of "]" character. Two ends of the second traction rod are rotatably connected to an eccentric position of a driving disk and a side wall of the second sliding plate respectively. The first traction rod and the second traction rod are located at two sides of the driving disk respectively, and a distance between a joint of the second traction rod and the driving disk and a center of the driving disk is smaller than that between a joint of the first traction rod and the driving disk and the center of the driving disk. When ammonia nitrogen is removed from the electrolytic manganese residue leachate in the treatment tank, the guiding holes are plugged by plugging rods. The screw rod is removed. When the motor drives the driving disk to rotate, the sliding block and the partition plate are driven to reciprocate. Because the guiding holes are plugged by the plugging rods, the electrolytic manganese residue leachate only enters an overflow groove from the drainage holes and then is discharged through the liquid outlet groove and the liquid outlet hole, thereby separating struvite and the electrolytic manganese residue leachate with ammonia nitrogen removed.

Optionally, a multilayer filter screen is arranged in each of the drainage holes. By arranging the filter screen, some solids in the struvite and the electrolytic manganese residue leachate are stopped, and the purification effect of electrolytic manganese residue leachate is further improved.

Optionally, the outer wall of the treatment tank is provided with two discharge ports. The two the discharge ports are respectively adjacent to two side walls of the treatment tank, and the two the discharge ports are both detachably connected with discharge doors for closing and opening the discharge ports. Through arranging the discharge doors, it is more convenient to take out the struvite.

BRIEF DESCRIPTION OF THE DRAWINGS

FIG. 5 is a flow chart of a method for removing ammonia nitrogen from electrolytic manganese residue.

DETAILED DESCRIPTION OF THE EMBODIMENTS

The following will be explained in detail through specific embodiments.

Embodiment 1

Figure 1:
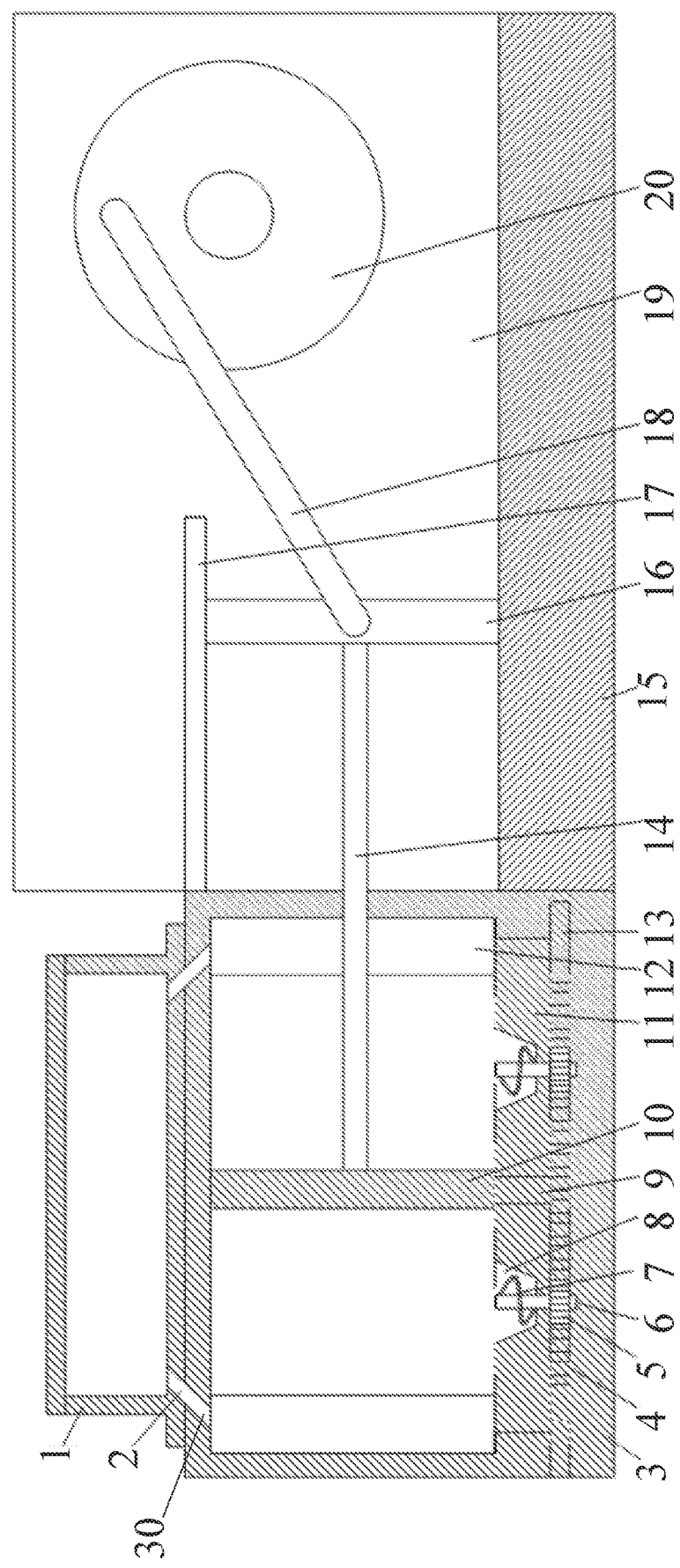
FIG. 1 is a schematic structural diagram of an apparatus for removing ammonia nitrogen from electrolytic manganese residue in Embodiment 1 of the present disclosure.
Figure 2:
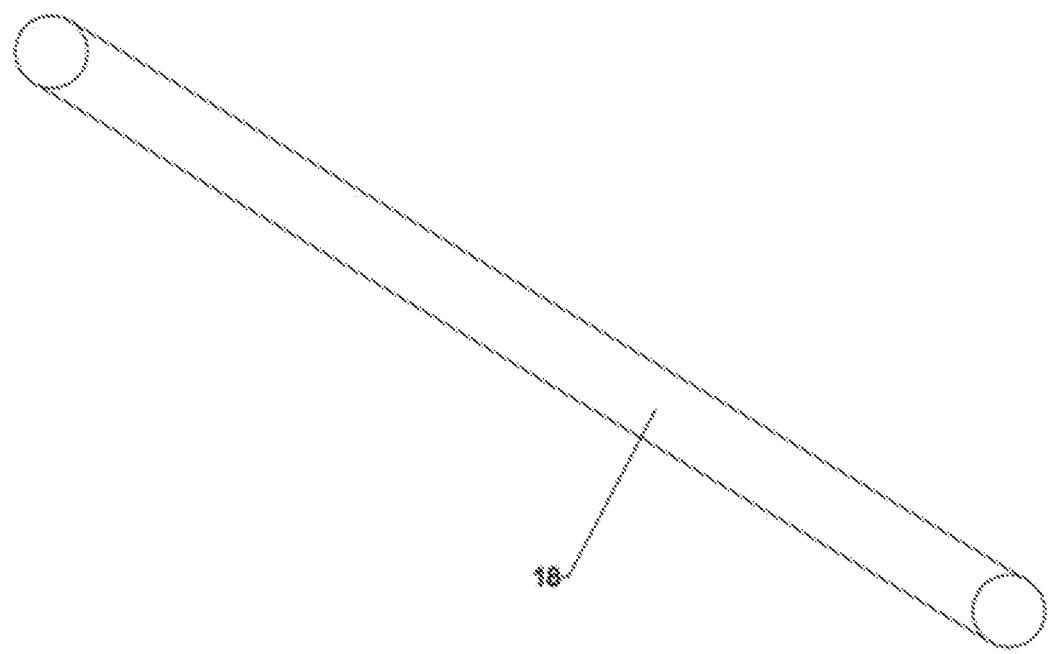
FIG. 2 is a rear view of a first traction rod in FIG. 1.
Figure 3:
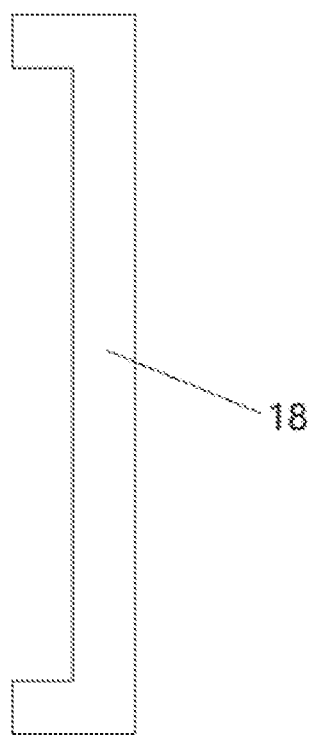
FIG. 3 is a side view of a first traction rod in FIG. 1.

As shown in FIG. 1, FIG. 2; and FIG. 3, an apparatus for removing ammonia nitrogen from electrolytic manganese residue includes a treatment tank 3, an overflow tank 1, a stirring component and an adjusting component. The overflow tank 1 is detachably connected to a top of the treatment tank 3 through screws; a tank bottom of the overflow tank 1 is attached to an upper surface of the treatment tank 3, and a top of the overflow tank 1 is open and detachably connected with a tank cover. A bottom of the overflow tank 1 and the top of the treatment tank 3 are both provided with two groups of guiding holes 2. The two groups of the guiding holes 2 are adjacent to opposite side walls (the side walls in a longitudinal direction) of the overflow tank 1 and the treatment tank 3, and corresponding guiding holes on a same side of the overflow tank 1 and the treatment tank 3 are communicated. A lower surface of the treatment tank 3 is provided with a limiting groove 11 and grooves 8, and the grooves 8 are similarly inverted frustum-shaped. A chute 13 is arranged in a wall of the treatment tank 3 along length direction of the wall. One end of the chute 13 penetrates through the wall of the treatment tank 3, and the chute 13 is located directly below the limiting groove 11. The arrangement of the chute 13 is convenient for installing the racks 4, and plugging is performed after installation. The outer wall of the treatment tank 3 is provided with two discharge ports 34, the two discharge ports 34 are respectively adjacent to two side walls in a length direction of the treatment tank 3, the two discharge ports 34 are detachably connected with discharge doors 12 for closing and opening the discharge ports 34.

The adjusting component includes a partition plate 10 and a driving component for driving the partition plate 10 to reciprocate in the treatment tank 3. The partition plate 10 is vertically arranged and divides the treatment tank 3 into a left portion and a right portion, and the guiding holes 2 on the treatment tank 3 are located in a movement direction of the partition plate 10. The stirring component includes stirring rods 6 and racks 4, where the racks 4 are slidably connected in the chute 13. The stirring rods 6 are rotatably connected in the wall of the treatment tank 3. Two ends of the stirring rods 6 are respectively provided with gears 5 and stirring blades 7. The stirring blades 7 are spiral and located in the grooves 8. The gears 5 are meshed with the racks 4; and a connecting rod 9 is integrally formed at a bottom of the partition plate 10, and the connecting rod 9 is square. The connecting rod 9 is located in the limiting groove 11 and is fixedly connected with the racks 4.

The outer wall of the treatment tank 3 is fixedly connected with a base 15 through screws, and a vertically arranged fixed plate 19 is fixedly connected with the base 15 through screws, and a first limiting plate 17 is welded on the fixed plate 19. The partition plate 10 is welded with a first driving rod 14, the first driving rod 14 extends out of the treatment tank 3. One end of the first driving rod 14 far away from the partition plate 10 is fixedly connected with a first sliding plate 16, the first sliding plate 16 is slidably connected between the first limiting plate 17 and the base 15. The driving component includes a first traction rod 18, a motor and a driving disk 20 mounted on the motor. The motor is mounted on the fixed plate 19, the driving disk 20 is round cake-shaped. The first traction rod 18 is in a shape of "]" character. Two ends of the first traction rod 18 are rotatably connected to the eccentric position of the driving disk 20 and the side wall of the first sliding plate 16 (in FIG. 1, the limiting groove 11, the chute 13 and the racks 4 are drawn by dotted lines).

Embodiment 2

Figure 4:
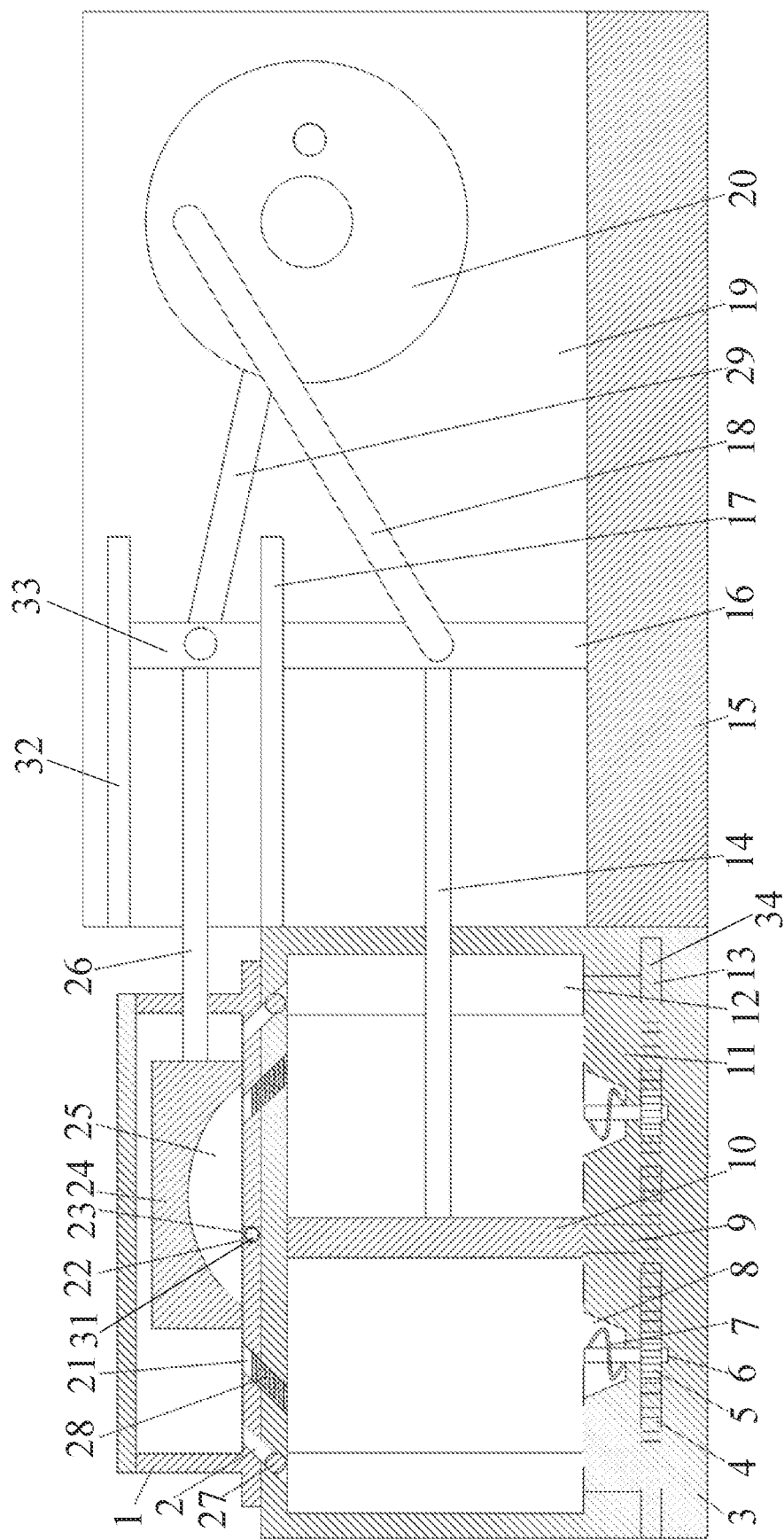
FIG. 4 is a schematic structural diagram of an apparatus for removing ammonia nitrogen from electrolytic manganese residue in Embodiment 2 of the present disclosure.

With reference to FIG. 4, the difference between embodiment 2 from the embodiment 1 is that the overflow tank 1 is internally connected with a sliding block 24 in a sliding way, and a bottom of the sliding block 24 is provided with a drainage groove 25. The bottom of the overflow tank 1 and the top of the treatment tank 3 are both provided with two groups of drainage holes 21, and the two groups of the drainage holes 21 are located between the two groups of the guiding holes 2. Corresponding drainage holes 21 on a same side of the overflow tank 1 and the treatment tank 3 are communicated. A multilayer filter screen 28 is arranged in each of the drainage holes 21, and an aperture of the filter screen 28 is 325 meshes. A length of the drainage groove 25 is smaller than a distance between the two groups of the drainage holes 21, where one group of drainage holes 21 are communicated with the drainage groove 25. An inner bottom of the overflow tank 1 is provided with a liquid outlet groove 22, the liquid outlet groove 22 is always located in the drainage groove 25, and the outer wall of the overflow tank 1 is provided with a liquid outlet hole 23 communicated with the liquid outlet groove 22, and the liquid outlet hole 23 is connected with a screw rod 31 by threads. The outer wall of the treatment tank 3 is provided with connecting holes 30. The connecting holes 30 are communicated with the guiding holes 2, and the connecting holes 30 are internally connected with plugging rods 27 by threads for plugging the guiding holes 2. The fixed plate 19 is fixedly connected with a second limiting plate 32, the second limiting plate 32 is located above the first limiting plate 17, and a second sliding plate 33 is connected in a sliding way between the first limiting plate 17 and the second limiting plate 32. A second driving rod 26 is welded on the sliding block 24, and one end of the second driving rod 26 away from the sliding block 24 extends out of the overflow tank 1 and is fixedly connected with the second sliding plate 33. The driving component also includes a second traction rod 29, and the second traction rod 29 is also in a shape of "]" character. Two ends of the second traction rod 29 are rotatably connected to an eccentric position of the driving disk 20 and the side wall of the second sliding plate 33 respectively. The first traction rod 18 and the second traction rod 29 are located on both sides of the driving disk 20, and a distance between a joint of the second traction rod 29 and the driving disk 20 and a center of the driving disk 20 is smaller than that between a joint of the first traction rod 18 and the driving disk 20 and the center of the driving disk 20.

Embodiment 4 differs from the Embodiment 1 only in that the overflow tank 1 and the treatment tank 3 are integrally formed.

Embodiment 5 differs from Embodiment 2 only in that overflow tank 1 and treatment tank 3 are integrally formed.

Embodiment 6 provides a method for removing ammonia nitrogen from electrolytic manganese residue by using the apparatus in embodiment 2. The method includes the following steps as shown in FIG. 5: step 1, taking 100 liters (L) of raw waste liquid (electrolytic manganese residue leachate)+100 L of deionized water=200 L of total volume of reaction solution, converting the concentration of each ion in the solution after mixing, and adding chemicals according to the conditions of n (Mg):n (N):n (P)=1.1:1. Firstly, the raw waste liquid and the deionized water are poured into the treatment tank 3 at both sides of the partition plate 10, and then the bone meal is dissolved in the 100 L of the deionized water, and $MgCl_2 \cdot 6H_2O$ is dissolved in the raw waste liquid (concentrations of $Mg^{2+}$ and $PO_4^{3-}$ of two samples are measured to verification of an calculation). After the bone meal and the $MgCl_2 \cdot 6H_2O$ are completely dissolved, the motor is started, with a rotation speed of the motor of 300 revolutions per minute (r/min), and the motor drives the partition plate 10 to reciprocate, so that the raw waste liquid and the deionized water are mixed. This process is kept for 15 minutes (min) until the $MgCl_2 \cdot 6H_2O$, the ammonia nitrogen and the bone meal in deionized water in the original waste liquid are fully mixed and reacted to obtain a mixed solution. Step 2, after a first stage of the reaction, a pH value of the mixed solution is adjusted to 10 with 250 gram/litre (g/L) sodium hydroxide and 100 g/L sodium hydroxide, respectively, and the mixed solution is stirred at a motor speed of 300 r/min at room temperature for reaction of 15 min. Step 3, the motor drives the sliding block 24 to move at a speed of 50 r/min until the liquid (electrolytic manganese residue leachate after ammonia nitrogen removal) in the mixed solution is discharged from the liquid outlet hole 23, then the struvite is removed through the discharge doors 12 and is dried at 40° C. Results show that a removal rate of the ammonia nitrogen is 98.2%, a concentration of $PO_4^{3-}$ in the electrolytic manganese residue leachate after ammonia nitrogen removal is 1.85 mg/L, and a purity of precipitated struvite reaches 88.2%.

A method for removing ammonia nitrogen from electrolytic manganese residue includes the following steps: taking 100 L of original waste liquid (electrolytic manganese residue leachate)+100 L of deionized water=200 L of total volume of reaction solution, converting the concentration of each ion in the solution after mixing, and adding chemicals according to the conditions of n (Mg):n (N):n (P)=1.1:1. Firstly, bone meal is dissolved in the 100 L of the deionized water, and $MgCl_2 \cdot 6H_2O$ is dissolved in the raw waste liquid (concentrations of $Mg^{2+}$ and $PO_4^{3-}$ of two samples are measured to verification of a calculation). After both the bone meal and the $MgCl_2 \cdot 6H_2O$ are completely dissolved, the bone meal and the $MgCl_2 \cdot 6H_2O$ are mixed and reacted, and then a pH value of a mixed solution is adjusted to 10 with 250 g/L sodium hydroxide or 100 g/L sodium hydroxide, and the mixed solution is stirred at motor speed of 300 r/min at room temperature for reaction of 15 min. The mixed solution is let stand and precipitated. A supernatant part is partially filtered through a 0.45 micron (μm)-filter membrane, and irons including $NH_4^+$—N, $PO_4^{3-}$—P, $Mg^{2+}$, $Mn^{2+}$ and $Ca^{2+}$ of obtained water samples are analyzed. A precipitated part is centrifuged in a centrifuge at 2000 r/min for 10 minutes and then dried in an oven at 40° C. for 48 hours (h). The results show that the removal rate of ammonia nitrogen is 97.7%, a concentration of $PO_4^{3-}$ in the electrolytic manganese residue leachate after ammonia nitrogen removal is 2.26 mg/L, and a purity of precipitated struvite reaches 87.9%.

What has been described above is only embodiments of the present disclosure, and common sense such as specific structure and characteristics well-known in the scheme is not described here. It should be pointed out that for those skilled in the art, modifications and improvements may be made without departing from the structure of the disclosure, which should also be regarded as the protection scope of the disclosure, and these will not affect the implementation effect of the disclosure and the practicability of the patent. The scope of protection required by this disclosure shall be subject to the contents of the claims, and the detailed description in the specification may be used to explain the contents of the claims.

What is claimed is:

1. An apparatus for removing ammonia nitrogen from electrolytic manganese residue, comprising a treatment tank, an overflow tank, a stirring component and an adjusting component, wherein the overflow tank is connected to a top of the treatment tank, and a tank bottom of the overflow tank is attached to a surface of the treatment tank, a bottom of the overflow tank and the top of the treatment tank are both provided with two groups of guiding holes, the two groups of guiding holes are adjacent to opposite side walls of the overflow tank and the treatment tank, and corresponding guiding holes on a same side of the overflow tank and the treatment tank are communicated, a lower surface of the treatment tank is provided with a limiting groove and grooves, a chute is arranged in a wall of the treatment tank along a length direction thereof, one end of the chute penetrates through the wall of the treatment tank, and the chute is located right below the limiting groove; the adjusting component comprises a partition plate and a driving component driving the partition plate to reciprocate in the treatment tank, the partition plate is vertically arranged and divides the treatment tank into two portions, and the guiding holes on the treatment tank are located in a movement direction of the partition plate, the stirring component comprises stirring rods and racks, the racks are slidably connected in the chute, and the stirring rods are rotatably connected in the wall of the treatment tank, two ends of the stirring rods are respectively provided with gears and stirring blades, the stirring blades are positioned in the grooves, and the gears are meshed with the racks, a bottom of the partition plate is fixedly connected with a connecting rod, and the connecting rod is positioned in the limiting groove and fixedly connected with the racks; an outer wall of the treatment tank is fixedly connected with a base, a fixed plate is vertically and fixedly connected with the base, and a first limiting plate is fixedly connected with the fixed plate, the partition plate is fixedly connected with a first driving rod, the first driving rod extends out of the treatment tank, and one end of the first driving rod away from the partition plate is fixedly connected with a first sliding plate, the first sliding plate is connected between the first limiting plate and the base in a sliding way, the driving component comprises a first traction rod, a motor and a driving disk installed on the motor, and the first traction rod is in a shape of "]" character; two ends of the first traction rod are rotatably connected to an eccentric position of the driving disk and a side wall of the first sliding plate respectively; the overflow tank is internally connected with a sliding block in a sliding way, a bottom of the sliding block is provided with a drainage groove, the bottom of the overflow tank and the top of the treatment tank are both provided with two groups of drainage holes, the two groups of drainage holes are both located between the two groups of guiding holes, and corresponding drainage holes on a same side of the overflow tank and the treatment tank are communicated; a length of the drainage groove is smaller than a distance between the two groups of drainage holes, wherein one group of the drainage holes is communicated with the drainage groove, an inner bottom of the overflow tank is provided with a liquid outlet groove, an outer wall of the overflow tank is provided with a liquid outlet hole communicated with the liquid outlet groove, and the liquid outlet hole is connected with a screw rod by threads; the outer wall of the treatment tank is provided with connecting holes, the connecting holes are communicated with the guiding holes, and the connecting holes are internally connected with plugging rods for plugging the guiding holes by threads, the fixed plate is fixedly connected with a second limiting plate, the second limiting plate is positioned above the first limiting plate, and a second sliding plate is connected between the first limiting plate and the second limiting plate in a sliding way, the sliding block is fixedly connected with a second driving rod, and one end of the second driving rod away from the sliding block extends out of the overflow tank and is fixedly connected with the second sliding plate; the driving component also comprises a second traction rod, and the second traction rod is also in a shape of "]" character; two ends of the second traction rod are rotatably connected to an eccentric position of a driving disk and a side wall of the second sliding plate respectively; the first traction rod and the second traction rod are located at two sides of the driving disk respectively, and a distance between a joint of the second traction rod and the driving disk and a center of the driving disk is smaller than a distance between a joint of the first traction rod and the driving disk and the center of the driving disk.

2. The apparatus for removing the ammonia nitrogen from the electrolytic manganese residue according to claim 1, wherein the stirring blades are spiral.

3. The apparatus for removing the ammonia nitrogen from the electrolytic manganese residue according to claim 2, wherein a multilayer filter screen is arranged in each of the drainage holes.

4. The apparatus for removing the ammonia nitrogen from the electrolytic manganese residue according to claim 3, wherein the outer wall of the treatment tank is provided with two discharge ports, the two the discharge ports are respectively adjacent to two side walls of the treatment tank, and the two the discharge ports are both detachably connected with discharge doors for closing and opening the discharge ports.

5. A method for removing ammonia nitrogen from electrolytic manganese residue, using the apparatus for removing the ammonia nitrogen from the electrolytic manganese residue according to claim 1 to remove the ammonia nitrogen from the electrolytic manganese residue and comprising following steps:

step 1: pouring the electrolytic manganese residue leachate and deionized water respectively into the treatment tank at both sides of the partition plate according to a volume ratio of 1:1, then dissolving bone meal in the deionized water, dissolving $MgCl_2 \cdot 6H_2O$ in the electrolytic manganese residue leachate, starting the motor after the bone meal and the $MgCl_2 \cdot 6H_2O$ are completely dissolved, with a motor speed of 300 r/min, driving the partition plate by the motor to reciprocate, thereby mixing the electrolytic manganese residue leachate with the deionized water, and keeping this process for 15 min until the $MgCl_2 \cdot 6H_2O$, ammonia nitrogen in the electrolytic manganese residue leachate and the bone meal in the deionized water are fully mixed and reacted to obtain a mixed solution, wherein in the mixed solution n (Mg):n (N):n (P)=1.1-1.3:1:1;

step 2: on a basis of the step 1, adjusting a pH value of the mixed solution to 10 with 250 g/L sodium hydroxide or 100 g/L sodium hydroxide, and stirring and reacting for 15 min under a condition of the 300 r/min of the motor at room temperature; and step 3: on a basis of the step 2, driving the sliding block to move by the motor under a condition of 50 r/min until liquid in the mixed solution is discharged from the liquid outlet hole to separate struvite and electrolytic manganese residue leachate after ammonia nitrogen removal.

* * * * *